United States Patent [19]

McFarlane et al.

[11] Patent Number: 4,830,865

[45] Date of Patent: May 16, 1989

[54] METHOD FOR ASEPTICALLY PROCESSING A FOOD PRODUCT

[75] Inventors: Donald P. McFarlane, Pavilion; Roderick E. Athey, Pittsford, both of N.Y.

[73] Assignee: Graham Corporation, Batavia, N.Y.

[21] Appl. No.: 942,084

[22] Filed: Dec. 15, 1986

[51] Int. Cl.$^4$ .............................................. A23L 3/22
[52] U.S. Cl. ..................................... 426/399; 165/87; 415/73; 417/67; 426/400; 426/521; 426/523; 426/402; 426/509; 99/470; 99/355; 99/478; 99/483
[58] Field of Search ............... 426/521, 523, 399, 400, 426/402, 509; 165/87; 417/67, 65; 415/73; 99/352, 355, 356, 443 R, 443 C, 483, 478, 479, 470

[56] References Cited

U.S. PATENT DOCUMENTS

| | | | |
|---|---|---|---|
| 2,327,732 | 8/1943 | McKinnis | 426/521 |
| 2,517,542 | 8/1950 | Clifcorn et al. | 426/405 |
| 3,139,812 | 7/1964 | Smith et al. | 99/355 |
| 3,489,074 | 1/1970 | Farkas et al. | 417/65 |
| 3,586,510 | 6/1971 | Farkas et al. | 426/523 |
| 3,700,468 | 10/1972 | Shore et al. | 426/521 |
| 3,721,527 | 3/1973 | Lodige et al. | 426/521 |
| 3,769,028 | 10/1973 | Katz et al. | 426/523 |
| 3,788,392 | 1/1974 | Abbott et al. | 99/348 |
| 3,846,570 | 11/1974 | Vetter et al. | 426/521 |
| 3,873,753 | 3/1975 | Nelson et al. | 426/521 |
| 3,992,148 | 11/1976 | Teighmouth et al. | 426/521 |
| 4,022,922 | 5/1977 | Nelson | 426/521 |
| 4,059,919 | 11/1977 | Green | 426/521 |
| 4,255,459 | 3/1981 | Glen | 426/521 |
| 4,444,797 | 4/1984 | Britain et al. | 426/523 |
| 4,511,589 | 4/1985 | Padly et al. | 426/521 |
| 4,547,383 | 10/1985 | Goldhahn | 426/521 |
| 4,637,936 | 1/1987 | White et al. | 426/521 |

*Primary Examiner*—Steven Weinstein
*Attorney, Agent, or Firm*—Cumpston & Shaw

[57] ABSTRACT

A method and apparatus are disclosed for continuously and gently aseptically processing a food product comprising delicate food chunks of fruit, vegetables or the like immersed in a liquid. The apparatus comprises a heating enclosure into which the food product and a nonsterile gas are introduced and the food product heated to a sterilization temperature, and a holding enclosure which may be integral with or separate from the heating enclosure for holding the food product and a sterile gas introduced therein at the sterilization temperature for a predetermined time. The apparatus further preferably comprises a cooling enclosure for cooling the food product. Although the heating, holding and cooling enclosures are preferably separate enclosures provided with rotatable helical feed pumps in product communication with one another for feeding the food product and a gas through the enclosures in succession, the heating, holding and cooling functions may be achieved in a single enclosure through which the food product and gas are fed by a single helical pump. In a preferred embodiment, a first separator is interposed between the heating and holding enclosures for separating a nonsterile gas from the food product. The food product and an added sterile gas are fed into the rotatable helical feed pump in the holding enclosure. A second separator receives the aseptic food product from the rotatable helical feed pump in the cooling enclosure for separating the aseptic gas and a portion of the liquid from the food product to produce aseptic food chunks which are then fed along with a predetermined quantity of the aseptic liquid to any suitable container filling machine.

11 Claims, 6 Drawing Sheets

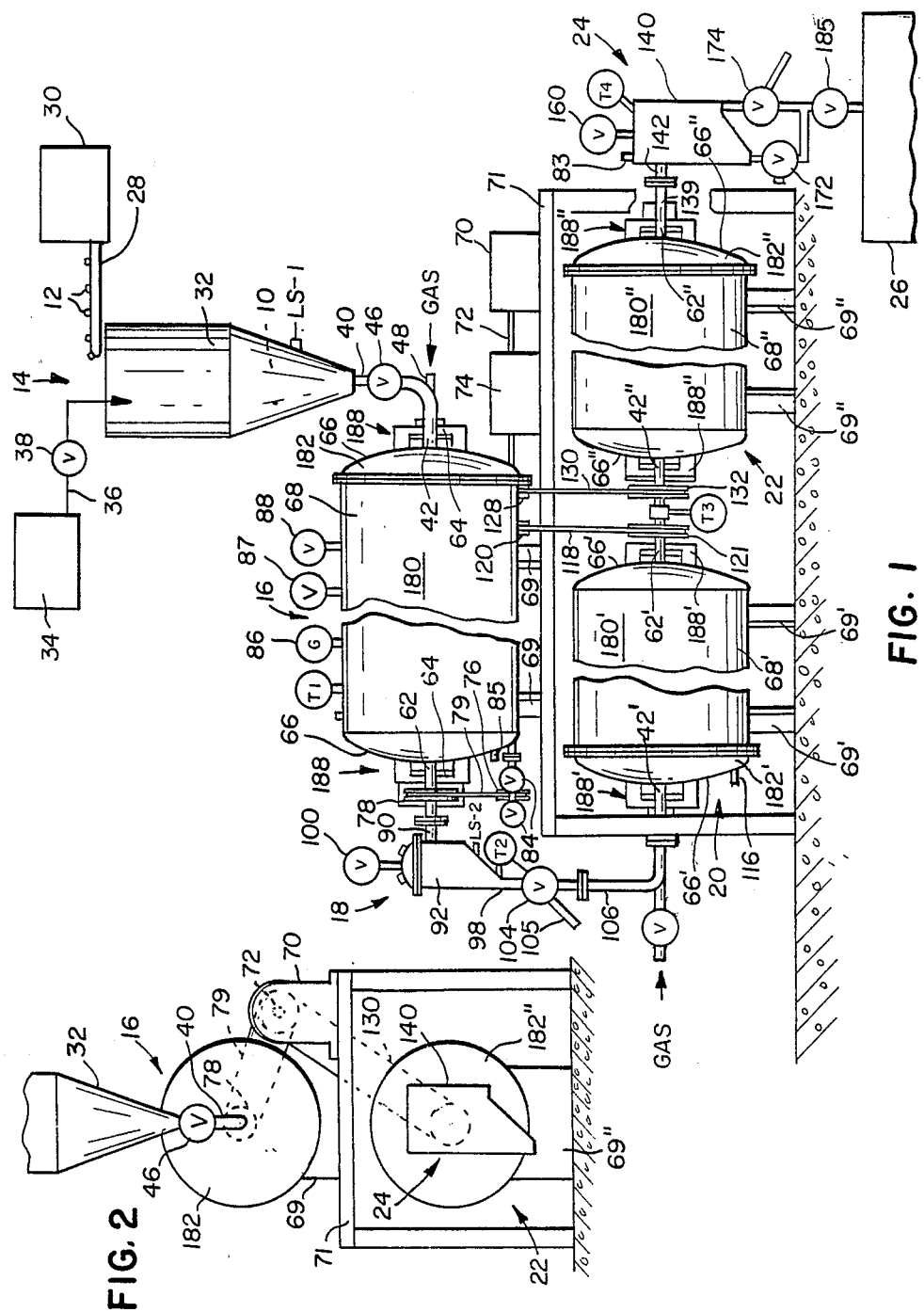

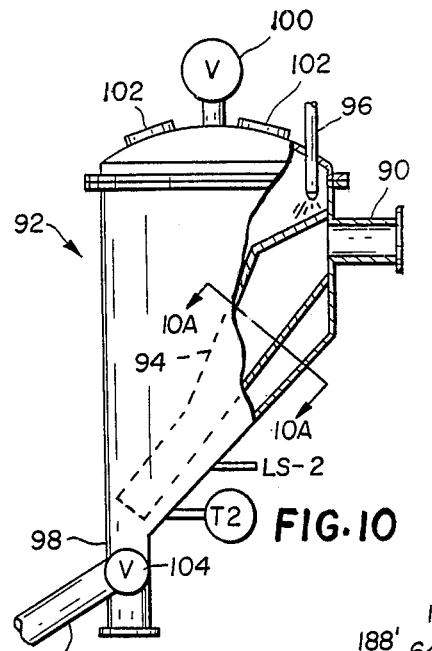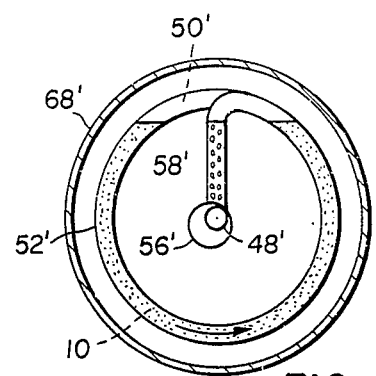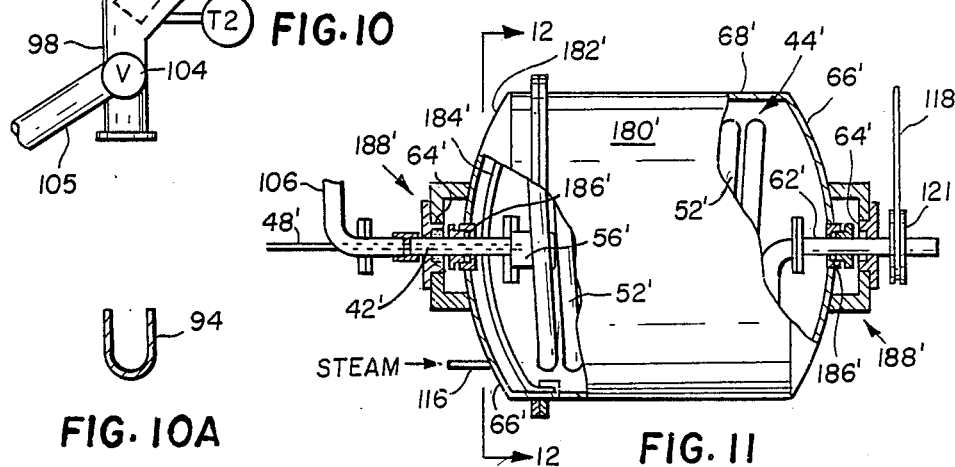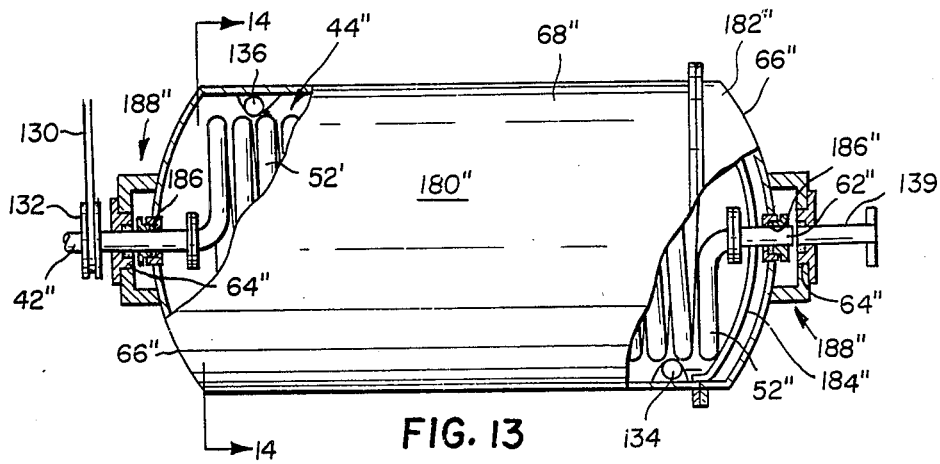

HOT FILL
BAG COOLING
MACHINE

METHOD FOR ASEPTICALLY PROCESSING A FOOD PRODUCT

RELATED APPLICATIONS

This application is a continuation-in-part of application Ser. No. 837,512, filed Mar. 7, 1986 now abandoned.

FIELD OF THE INVENTION

This invention relates generally to food processing, and more specifically to a method and apparatus for continuously and gently aseptically processing a food product of the type comprising delicate food chunks of fruit, or vegetables or the like immersed in a liquid.

DESCRIPTION OF THE PRIOR ART

A food treating device with a helical pumping system is disclosed in U.S. Pat. Nos. 3,489,074 and 3,586,510 which issued to D. F. Farkas et al. on Jan. 13, 1970 and June 22, 1971, respectively. In U.S. Pat. No. 3,489,074, the food treatment device comprises a helical feed pump formed from a continuous coil of tubing, and a treatment chamber for receiving the food from the feed pump and conveying it by means of a cleated belt into the inlet of a helical discharge pump, also formed from a continuous coil of tubing. U.S. Pat. No. 3,586,510 discloses a food treatment device comprising a single continuous helical pump formed from a continuous coil of tubing wound on a drum and having a feed section, a holding section and a discharge section. In both devices, a slug of food material having a volume of ½ turn is fed into the feed pump for each revolution of the helical pump.

One problem encountered by the known food treatment devices is that food product can only be fed into the helical feed pump for ½ turn of the pump resulting in a maximum input ratio of food product to gas of 1 to 1. This seriously limits the rate of throughput of food product achieved by the food processing device resulting in reduced efficiency of food processing. Also, such known food treatment devices further suffer from the problem of transient conditions resulting, for example, from minor variations in the rate of liquid and the food product being fed into the feed pump, and the trapping of bubbles of gas in the liquid entering the feed pump. These transients will cause instability of operation resulting, among other things, in a reduced throughput of food product, and an increased exposure time of food product on the dry inner tube wall surface resulting in product "burn on", forming a residue on the inner tube wall surface. The residue deleteriously affects the quality of the food product, the efficiency of the apparatus, and greatly increases "down time" required to clean the feed pump. Still further, prior art processing methods and apparatus while providing effective sterilization, do so by heating the food products in an inefficient manner whereby the heat up and cool down time periods are longer than desirable and the quality, e.g., the texture and taste of the food product, is diminished. In addition, prior art processing apparatus such as a scraped surface heat exchanger undesirably damages the food product during processing and therefore can often only be used for foods where the damage is hidden, such as chili, chowder and the like, where the appearance of the food particles is not critically important. Other food products such as fruit and vegetable chunks cannot tolerate such damage and when processed in accordance with the prior art produce undesirably high amounts of unacceptable product. Finally, systems described by known food treatment devices have no provision to ensure sterilization of the gas used in the process. Since heat transfer into the gas is relatively poor compared to the food product, the gas fails to reach sterilization temperature.

SUMMARY OF THE INVENTION

In accordance with a preferred embodiment of the invention, a method and apparatus are disclosed for continuously and gently aseptically processing a food product comprising food chunks of delicate fruit, vegetables or the like immersed in a liquid, without damaging the delicate food chunks. In this preferred embodiment of the invention, aseptic processing is achieved by feeding a continuous uninterrupted stream of food product in a desired chunk-liquid ratio and a gas into the inlet of a rotatable helical feed pump. The feed pump is rotatably mounted in an enclosure in which the food product and gas are heated to a sterilization temperature and preferably maintained at the sterilization temperature for a time sufficient to sterilize the food product. In those situations in which the food product is not maintained at the sterilization temperature within the enclosure for a time sufficient to sterilize the food product, such sterilization must occur during the time required for passage of the food product from the enclosure into any suitable receptacle, including any time spent in the receptacle prior to cooling the product. The food product and gas are fed from the enclosure into a separator which separates the gas from the food product. The food product free of gas can be fed into any suitable receptacle, such as a hot fill bag, for example. In the known hot fill bag process, the bag is filled with food product, heat sealed and cooled by water spray or the like.

In another preferred embodiment of the invention, the aseptic processing is achieved by feeding a continuous stream of food product in a desired chunk-liquid ratio and a gas into the inlet of a first rotating helical feed pump. The first feed pump is rotatably mounted in a heating enclosure in which the food product and gas are heated to a sterilization temperature. The heated food product and gas are fed from the outlet of the first feed pump into a second feed member. The second feed member is mounted in a holding enclosure where the product and gas are maintained at the sterilization temperature for a time sufficient to sterilize the food product. The sterile or aseptic product and gas are fed from the second feed member into a separator which separates the gas and most of the aseptic liquid from the sterile or aseptic food product. The food product devoid of gas is fed into any suitable container filling machine.

In other preferred embodiments of the invention, a first gas is introduced into the first helical food pump, the second and third feed members comprise rotating helical feed pumps, a first separator is interposed between the first and second feed pumps for separating the first gas from the food product, and a second gas is fed into the second feed pump. The first gas is not necessarily sterile, while the second gas is a sterile gas. The heating, holding and cooling coils and separators are all maintained at a positive pressure (above atmospheric pressure). The positive pressure is developed inside the heating coil due to heating the food product, and is maintained in the holding and cooling coils and separators by a venting arrangement. Also, the first and second helical feed pumps are provided at the inlets thereof with first and second eccentric gas accumulators for receiving the nonsterile and sterile gasses, respectively. Each gas accumulator is cylindrical and has an axis radilly offset from the axis of the feed pump. A line extending through the axes of the gas accumulator and feed pump forms an angle of about 45° with a radially extending inlet leg of the feed pump. Each gas accumulator further houses a food product guiding device comprising a plurality of parallel, spaced apart rods for guiding the food product from the food inlet pipe to the inlet leg of the helical pump.

In a more specific aspect of the invention, the sterile gas and liquid separator comprises a separator enclosure having an inlet and outlet, a vent in the separator enclosure, and a food product guideway mounted within the separator enclosure for connecting the separator inlet to the separator outlet, the guideway comprising a plurality of parallel spaced apart wires.

A primary advantage or object of this invention is to solve the shortcomings or problems set forth in relation to prior known food treating devices. Specifically, the method and apparatus of this invention retains the flavor and texture of the product by heating the product rapidly to a sterilization temperature, holding the product at the temperature only long enough to sterilize it and cooling it quickly. This object is achieved by, among other things, continuously feeding a food product comprising delicate food chunks of fruit, vegetable or the like immersed in a liquid in a predetermined ratio of food chunks to liquid directly into a helical feed pump. This object is further achieved by providing the helical feed pump with a gas accumulator at the inlet thereof to allow the continuous introduction of gas into the accumulator during operation of the processing apparatus.

Another contributing factor to solving the problems posed by prior known treatment devices is maintaining enclosures and separators at a positive pressure to prevent nonsterile air or the like from entering therein through possible pin-hole leaks or the like in the outer walls thereof. Still another contributing factor is interposing a first separator between first and second helical feed pumps to purge the food product of any nonsterile gas. By purging the nonsterile gas, the need is eliminated for the provision of means in the heating system to ensure sterilization of the gas, which is known to be less heat conductive than the food product. Such provision would require increasing the gas heating time by increasing the number of coils in the heating feed pump, for example, in order to raise the temperature of the gas to the food product sterilization temperature. Having purged the nonsterile gas, a preheated, filtered, sterile gas is introduced into the inlet of the second helical feed pump to assure a food product output that is sterile and aseptic.

The invention and its advantages will become more apparent from the detailed description of the invention presented below.

BRIEF DESCRIPTION OF THE DRAWINGS

In the detailed description of the invention presented below, reference is made to the accompanying drawings, in which:

FIG. 1 is a side elevational view, partly in diagrammatic form, of a preferred embodiment of the apparatus of this invention for aseptically processing a food product in accordance with the method of this invention;

FIG. 2 is an elevational end view of the apparatus of FIG. 1;

FIG. 10 is an enlarged section view of the first separator of the apparatus of FIG. 1;

FIG. 10A is a section view taken substantially long line 10A—10A of FIG. 10;

FIG. 11 is an enlarged section view of the holding enclosure and second helical feed pump of the apparatus of FIG. 1;

FIG. 12 is a section view taken substantially along line 12—12 of FIG. 11 showing the inlet end of the second helical feed pump and the food product and gas interface in the first coil, as if it were transparent;

FIG. 13 is an enlarged section view of the cooling enclosure and third helical feed pump of FIG. 1;

DETAILED DESCRIPTION OF THE INVENTION

Figure 3:
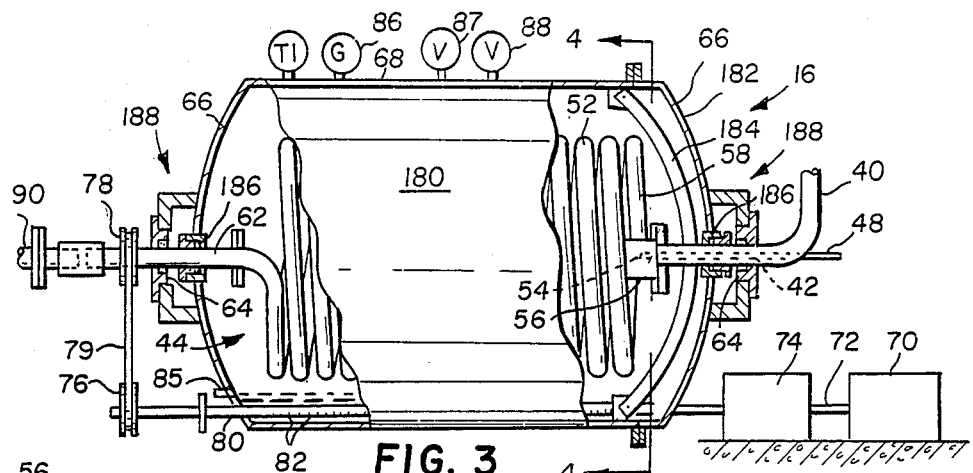
FIG. 3 is an enlarged side elevational view of the heating enclosure and first helical feed pump of the apparatus of FIG. 1 with portions thereof broken away and sectioned.

Referring now to FIGS. 1 and 2 of the drawings, a preferred embodiment of the apparatus of this invention is shown for continuously and gently aseptically processing a food product 10. The food product comprises, for example, food chunks 12 of fruit, vegetables or the like, such as peaches, pineapple or potatoes, immersed in any suitable compatible liquid, such as, for example, fruit juice, vegetable juice or water.

One preferred embodiment of the aseptic food product processing apparatus, as best shown in FIG. 1, essentially comprises means 14 for feeding the food product 10 and a first nonsterile gas into a food product heating means 16 which heats the food product to a sterilization temperature of around 100° centigrade. The heated food product 10 and first gas are fed into a first separator means 18 which separates the nonsterile gas from food product 10. The food product discharged from the first separator means 18 and a second sterile gas are fed into a holding means 20 where the food product 10 is held at the sterilization temperature for a sufficient time to sterilize the food product. The first gas is vented from the first separator or recycled for further use. After sterilization, the food product 10 and second sterile gas are fed from the holding means 20 through a cooling means 22 for cooling the food product. The cooled aseptic food product 10 and second sterile gas are fed from the cooling means into a second separator means 24 where the sterile gas is vented to atmosphere or recycled for further use, and the aseptic food product 10 is separated into food chunks 12 and liquid. The aseptic food chunks 12 from the second separator means 24 are combined with a predetermined volume of the separated aseptic liquid in a predetermined ratio of food chunks 12 to liquid of three to one, for example, and fed to any suitable filling or canning machine 26.

In the event it is desired to use only one gas in the apparatus and to heat it along with the food product to its sterilization temperature in heating means 16, the first separator is eliminated from the system. The gas and food product are both fed together directly into holding means 20. No second gas is required in this embodiment, and there is no eccentric gas accumulator on holding feed pump 44'.

The food product feeding means 14 essentially comprises a conveyor 28 or the like for feeding food chunks 12 from a supply container 30 into any suitable mixing tank or hopper 32 in a controlled manner. A liquid is also supplied from a supply container 34 through a supply tube 36, preferably in spray form or alternately in a tangential flow, into mixing hopper 32 to form the food product 10. The ratio in volume of food chunks 12 to liquid is controlled by any suitable means, such as a variable liquid control valve 38 or by speed control of conveyor 28, for example. A volumetric food product ratio of food chunks to liquid found to be suitable in the practice of this invention is 1-to-1, although other ratios of food chunks to liquid can be used. The mixing hopper 32 has a lower level switch LS-1 electrically connected to any suitable level detector and alarm to indicate to the operator when the food product level is too low. A similar upper level switch, not shown, may be provided to indicate when the food product level is too high.

Figure 4A:
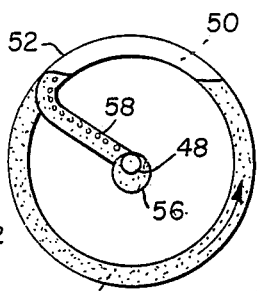
FIG. 4A is an enlarged section view of the portion of FIG. 4 showing the gas accumulator, inlet pipe and gas pipe.
Figure 4:
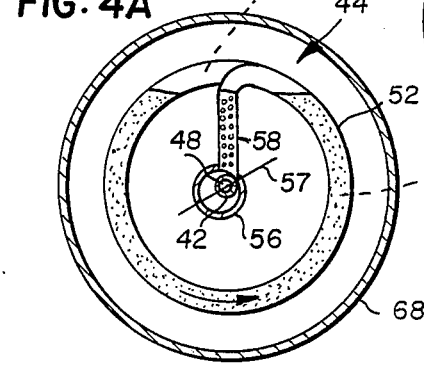
FIG. 4 is a section view taken substantially along line 4—4 of FIG. 3 showing the inlet end of the first helical feed pump, and the food product and gas interface in the first coil of the pump, if it were transparent.
Figure 4B:
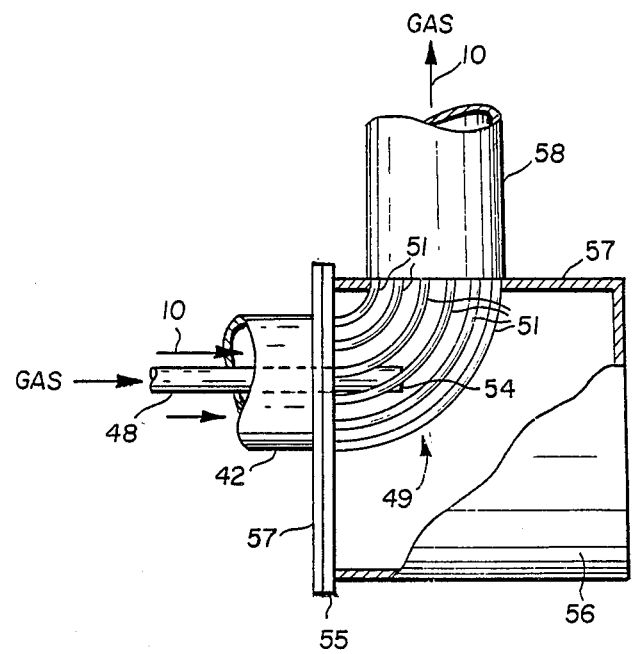
FIG. 4B is an enlarged side elevation view partially in section of the gas accumulator of FIG. 3 showing the food product guiding device.

With reference to FIGS. 3 and 4B, the food product 10 is fed via feed tube 40 into inlet pipe 42 of a helical feed pump 44 of the food product heating means 16 upon opening a food product feed valve 46 in tube 40. A first suitable nonaseptic gas, such as air or nitrogen, is also fed from a pressurized gas source, not shown, into helical feed pump 44 by a small diameter pipe 48 extending through an elbow of tube 40 into and through the center of inlet pipe 42. The helical feed pump 44, and pipes 42, 48 are all coaxial. The food product and gas flow into a gas accumulator 56. The food product is guided from the end of pipe 42 into a radially extending inlet leg 58 of first coil 52 by a guiding device 49 comprising a plurality of parallel, spaced apart wires or rods 51. The rods are held in a circular rigid configuration by securing the ends of the rods to openings in walls 55, 56 and to the end of inlet leg 58 of first coil 52 by any suitable means, such as welding, for example. The openings in walls 55, 56 are in alignment with the end of pipe 42 and inlet leg 58 respectively. Wall 55 forms a flange connected to a flange 57 at one end of pipe 42, and wall 56 is connected to one end of inlet leg 58.

With reference to FIGS. 4-9, the purpose for introducing a gas into the inlet of helical feed pump 44 is to provide an upper space 50 in each coil 52 of pump 44 of a density substantially less than the density of the food product 10. By virtue of this difference in density, the food product 10 is transported at a controlled rate through coils 52 upon rotation of helical feed pump 44. Since the helical feed pump 44 per se is not new, and the theory and operation thereof is described in detail in U.S. Pat. Nos. 3,489,074 and 3,586,510, such disclosure is incorporated by reference in this application, and no further description in regard to the known elements thereof is believed necessary.

Figure 5:
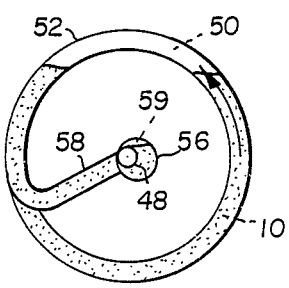
FIGS. 5–9 are end views of the first coil of the first helical feed pump showing the gas and food product interface at various angles of rotation of the feed pump.
Figure 6:
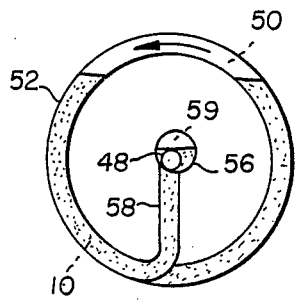
Figure 7:
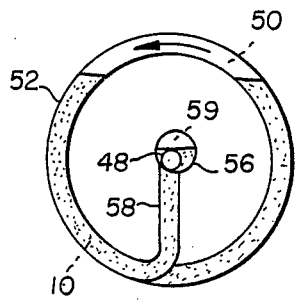
Figure 8:
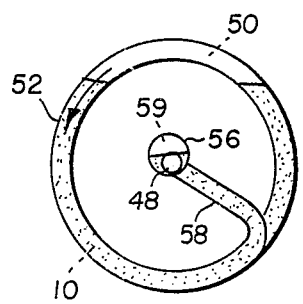
Figure 9:
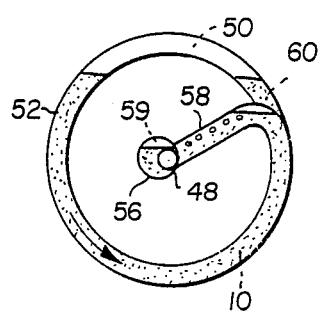

The outlet 54 of gas pipe 48 in gas accumulator 56 has an axis that is coaxial with the common axis of pipes 42, 48, as best seen in FIGS. 4A and 4B. The purpose of gas accumulator 56 is to allow continuous introduction of gas into helical feed pump 44. For most efficient operation, gas accumulator 56 is positioned at an angle relative to inlet leg 58 so that a line extending through the axes of tube 42 and gas accumulator 56 forms an angle of about 45° with inlet leg 58. With first coil 52 in the positions shown in FIGS. 4 and 5, gas continuously introduced into pipe 48 enters accumulator 56 and passes through the food product 10 in the upwardly positioned inlet leg 58 into upper space 50 of the coil. As feed pump 44 rotates further through the positions shown in FIGS. 6, 7 and 8, inlet leg 58 moves downwardly and is completely filled with food product 10 effectively preventing the less dense gas from passing therethrough, the gas instead rising and filling an upper space 59 within the accumulator instead of backing up into inlet pipe 42 and interfering with the continuous flow of food product 10 into the inlet pipe. When feed pump 44 rotates further to the position shown in FIG. 9, in which inlet leg 58 is inclined upwardly, the pressurized gas which is fed to accumulator 56 forces its way through food product 10 into inner leg 58 to form a gas pocket 60 at the upper end of inlet leg 58. For the remainder of such cycle of rotation, inlet leg 58 is positioned upwardly and the lighter gas passes therethrough into the upper coil space 50, as seen in FIGS. 4 and 5. The continuous flow of gas into gas accumulator 56 through each cycle of operation is necessary to achieve a gas filled space whose volume, density and specific gravity can be more consistently controlled. It has been found that by properly controlling the continuous gas flow along with the continuous flow of food product 10 to achieve a volumetric ratio of food product to gas of about five to one, a satisfactory and controlled rate of food product transport through helical feed pump 44 can be achieved.

The inlet pipe 42 and an outlet pipe 62 of helical feed pump 44 are rotatably mounted in bearings 64 mounted in bearing supports 188 secured to end plates 66 of a cylindrical heating enclosure 68, as best seen in FIG. 3. The enclosure is mounted on legs 69 (FIG. 1) resting on a metal support frame 71, which in turn is mounted on a concrete slab. The feed pump 44 is rotatably driven by any suitable drive motor 70 (FIGS. 1-3). The drive shaft 72 of motor 70 is drivingly coupled through a gear reducer 74 to feed pump 44 by a drive pulley 76 on drive shaft 72 driving a pulley 78 on pump outlet pipe 62 through a chain or belt connection 79.

The heating means for heating enclosure 68 comprises a closed end sparge pipe 80 (FIG. 3) extending into the enclosure adjacent the bottom thereof. The lower surface of pipe 80 has a plurality of radially extending holes 82 therethrough. A source of steam is connected through valves 84 (FIG. 1) to the open end of pipe 80 for introducing steam under pressure through pipe 80 and holes 82 therein for heating enclosure 68.

Condensate from the inner periphery of enclosure 68 and external surface of helical feed pump 44 collects at the bottom of enclosure 68 to form a pool of condensation within which pipe 80 is submerged. A condensate outlet 85 in enclosure 68 is provided to control the level of the condensate pool in enclosure 68. The submerged pipe, arrangement of steam outlet holes 82 and condensate function to prevent the feed pump coils 52 from overheating by maintaining the steam in a saturated condition. Without this arrangement, the steam would become superheated resulting in deleterious "burn on" of the food product 10 in the inner surface of the coils. The condensing temperature within heating enclosure 68, which is measured by a temperature gauge T1 on top thereof, can be controlled by regulating the steam pressure or by the introduction of a noncondensing gas, such as air, for example. For condensing temperatures above 100° centigrade, steam alone under pressure is satisfactory. For condensing temperatures below 100° centigrade, it is necessary to introduce air into the heating enclosure to control the condensing temperature while maintaining a pressure greater than atmospheric. A condensing temperature vent arrangement 87 is required to control the respective partial pressures of the steam and noncondensing gas (air) at temperatures below 100° centigrade. The heating enclosure is further provided on top thereof with a normal pressure gauge 86 and steam relief valve 88, for example.

With reference to FIGS. 1, 10 and 10A, outlet pipe 62 of helical feed pump 44 discharges food product 10 and gas through an inlet pipe 90 into a first separator 92. The outlet and inlet pipes 62, 90, respectively, have flanges, as best seen in FIG. 1, that are secured together by any suitable means, not shown. A sluiceway 94 of U-shaped cross-section in separator 92 has one end in alignment with and connected to inlet pipe 90, and is angled downwardly for guiding the food product toward the discharge end 98 of the separator. A food product level switch LS-2 is provided at the lower end of the separator to sense the level of the food product and to actuate an alarm, not shown, if the food product reaches that level. The pressurized gas emitted through inlet pipe 90 escapes from separator 92 through a vent 100 in the top wall of the separator. Windows 102 are provided in the top wall of separator 92 to allow the operator to observe the separator in operation. Separator 92 is further provided with a cleaning nozzle 96 at the upper end thereof through which liquid or steam may be directed for cleaning the separator.

With reference to FIGS. 1, 11 and 12, the food product 10, mainly devoid of gas and at its sterilization temperature, is fed by gravity from separator discharge end 98 through a food product diverting valve 104, a feed tube 106 and inlet pipe 42' into a helical holding feed pump 44' of holding means 20. Also, a sterile or aseptic gas, which is filtered and preheated to be free of live bacteria, is fed into gas accumulator 56' of holding feed pump 44' by a gas pipe 48' coaxially mounted within inlet pipe 42'. In describing holding means 20, parts similar to parts shown in previously described heating means 16 will be denoted by the same numerals primed. For example, holding feed pump 44' is substantially identical to heating feed pump 44 except for the number of coils 52' therein.

If the food product 10 discharged from separator 92 is below its sterilization temperature a temperature switch T2 on the separator is closed actuating valve 104 for movement to diverting position. In this position, the food product is diverted through tube 105 into any suitable container, not shown, for return to the mixing tank 32.

The inlet pipe 42' and outlet pipe 62' of holding feed pump 44' are rotatably mounted in bearings 64' mounted in bearing supports 188' secured to end plates 66' of a holding enclosure 68', as best seen in FIG. 11. The purpose of holding enclosure 68' is to maintain the food product 10 and aseptic gas at the sterilization temperature for a time sufficient to sterilize the food product. Since the heating and holding enclosures 68, 68', respectively, separator 92 and connections therebetween are well insulated, not shown, additional heat to holding enclosure 68' is not necessary. However, if additional heat is needed, steam can be introduced into holding enclosure 68' through a steam inlet pipe 116. The holding feed pump 44' is rotatably driven, as best seen in FIG. 1, by a belt or chain 118 trained over pulleys 120, 121 secured to drive shaft 72 and driven pipe 62', respectively.

Figure 14:
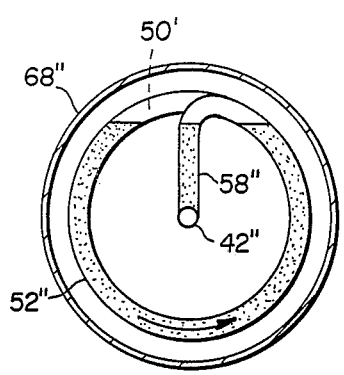
FIG. 14 is a section view taken substantially along line 14—14 of FIG. 13 showing the inlet end of the third helical feed pump and the food product and gas interface in the first coil, as if it were transparent.

With reference to FIGS. 1, 13 and 14, the cooling means 22 will be described, in which parts thereof similar to parts shown in the heating means 16 are denoted by the same numerals double primed. The sterilized food product 10 and gas are discharged from holding helical feed pump 44' into inlet tube 42" of cooling helical feed pump 44". The cooling helical feed pump is similar to heating and holding helical feed pumps 44, 44', respectively, with regard to coils 52, 52' except for the number thereof, and differs only in that it is not provided with a gas accumulator. The cooling helical feed pump 44" is rotatably mounted in bearings 64" mounted in bearing supports 188" secured to end plates 66" of cooling enclosure 68". The cooling feed pump 44" is rotatably driven by a drive pulley 128 on drive shaft 72 coupled by a chain 130 or belt to a driven pulley 132 on inlet tube 42". A coolant, such as cold water, for example, from any suitable source is fed into cooling enclosure 68" through an inlet pipe 134 near the bottom thereof, and the warmed water resulting from heat transfer between the coolant and hot coils 52" is discharged from cooling enclosure 68" through an outlet pipe 136 near the top thereof.

Figure 15A:
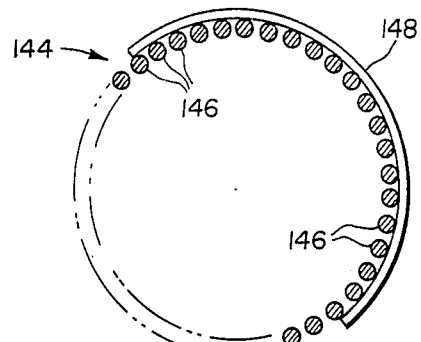
FIG. 15A is a section view taken substantially along line 15A—15A of FIG. 15.
Figure 15:
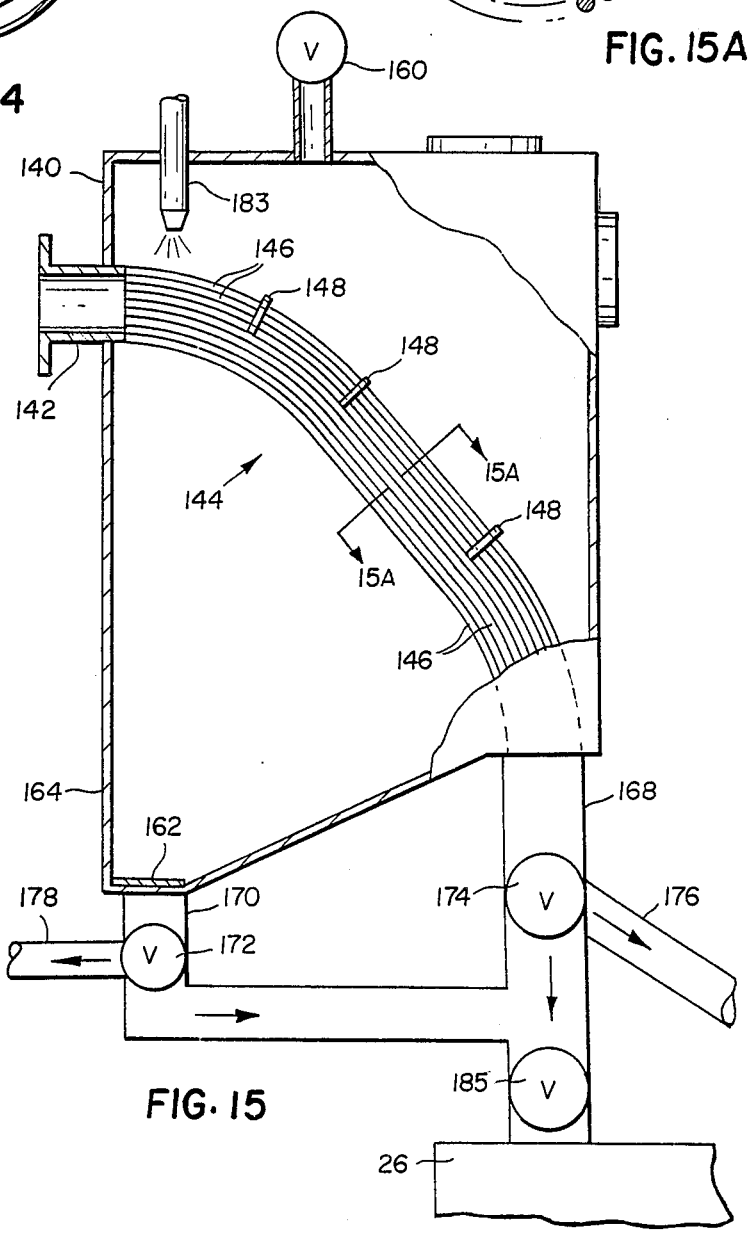
FIG. 15 is an enlarged section view of the second separator of the apparatus of FIG. 1.

With reference to FIGS. 1, 15 and 15A, the cooled aseptic food product 10 and aseptic gas are discharged from pump outlet pipe 62" into a second separator 140 through inlet pipes 139, 142. The separator 140 is designed to separate the gas and liquid from food product 10. The food product discharged from inlet pipe 142 is deposited into one end of a curved guideway 144 comprising a plurality of parallel, spaced apart wires 146. The wires are held in a circular configuration by spaced rings 148 secured to outer surfaces of the wires. The gas discharged from inlet pipe 142 and released from the food product 10 through spaced wires 146 is vented from separator 140 through a vent 160 in the top of the separator. The liquid passing through spaced wires 146 passes through a screen 162 at the bottom of a liquid catch basin 164 and through a drain pipe 170. The chunks 12 of fruit, vegetables or the like of the food product 10, now reduced in gas and liquid, are directed by guideway 144 into a product discharge outlet 168 of separator 140. The chunks 12 of fruit or the like pass through a temperature responsive diverting valve 174 similar to diverting valve 104 for diverting the food chunks below the sterlization temperature through tube 176 to any suitable container or the like, not shown, for return to food chunk supply container 30. Food chunks at the desired sterilization temperature pass through valve 174 and are joined with a predetermined volume of liquid, discharged from catch basin 164 through drain pipe 170 and controlled by any suitable control such as a valve 172, for passage through a valve 185 into any suitable container filling machine 26. By properly setting the liquid control, the desired volumetric ratio of food chunks to liquid, such as 3 to 1, for example, can be achieved. The unused liquid remaining in catch basin 164 can be pumped through a pipe 178 by any suitable pump, not shown, back into the liquid supply container 34. For cleaning purposes during shut down, the upper end of separator 140 can be provided with a spray nozzle 183 or the like.

Each of the heating, holding and cooling enclosures 68, 68' and 68", respectively, as best seen in FIGS. 1 and 3, is constructed of a body 180, 180' and 180", and a head 182, 182' and 182" having mating flanges secured together by bolts, not shown, at the nondrive ends thereof to allow disassembly of the enclosure for access to the helical feed pump for cleaning and repair. An internal feed pump end support 184, 184' and 184" is mounted to each body at the open end thereof to support the feed pump upon removal of the head. Also, all of the inlet and outlet pipes joining the components of the aseptic food product processing apparatus, such as the heating, holding and cooling enclosures 68, 68' and 68", respectively, and the first and second separators 92, 140, respectively, are provided with mating flanges and gaskets, not shown, secured together by bolts, bayonet connectors or the like, not shown.

Figure 16:
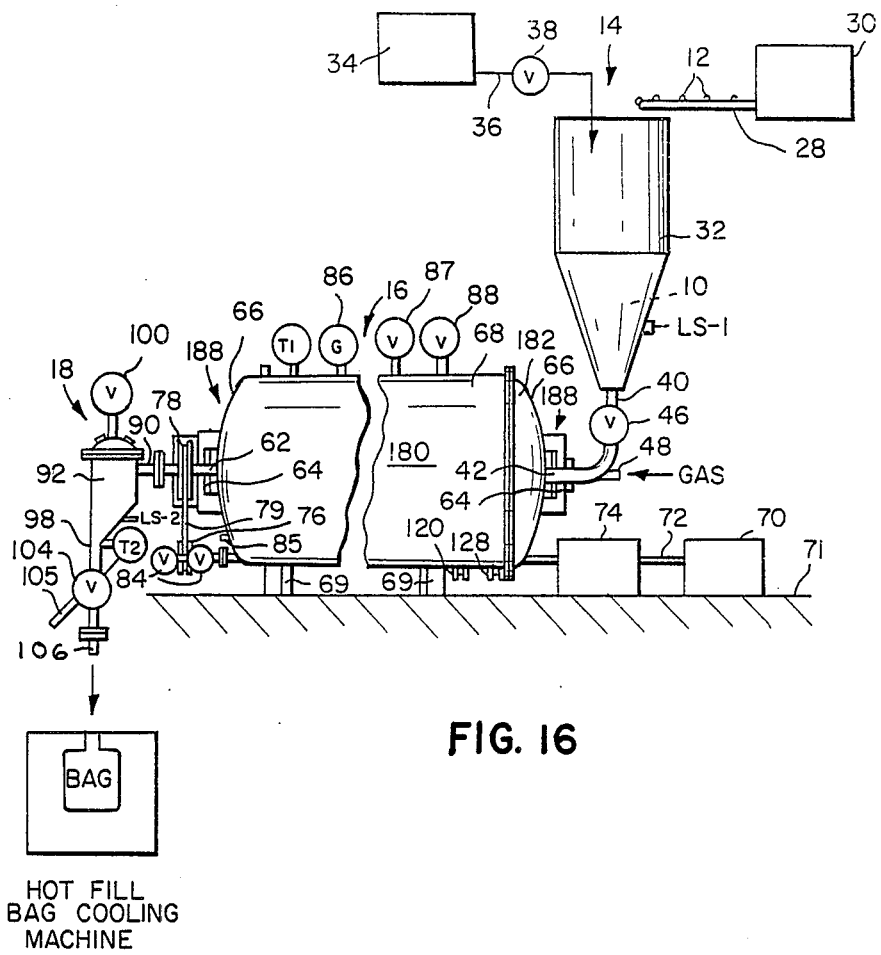
FIG. 16 is a side elevational view, partly in diagrammatic form of another embodiment of the apparatus of this invention.

In another preferred embodiment of the invention, as shown in FIG. 16, the food product 10, mainly devoid of gas and at its sterilization temperature or higher, is fed by gravity from separator discharge end 98 through a food product diverting valve 104 and a feed tube 106 into any suitable receptacle such as a hot-fill bag or the like while the food product remains at or above the sterilization temperature for a time sufficient to complete the sterilization of the food product before the hot fill bags cool to a substerilization temperature by convection, or are cooled by a water spray or any other suitable cooling means.

The invention has been described in detail with particular reference to preferred embodiments thereof, but it will be understood that variations and modifications can be effected within the spirit and scope of the invention.

What is claimed is:

1. A method for continuously and gently sterilizing a food product made up of food chunks immersed in a liquid without damaging the food chunks, comprising the steps of:
    feeding a continuous stream of said food product to be processed into the inlet of a first rotating tubular helical feed pump rotatably mounted in a heating enclosure in which the food product is heated to a sterilization temperature while
    feeding a gas into said first rotating tubular helical feed pump in an amount sufficient to obtain a volumetric ratio of food product to gas within the pump substantially greater than 1:1, said gas forming a bubble having a volume at least sufficient to divide the stream of food product in said pump into slugs such that each coil of the pump contains an upper gas filled space of a density substantially less than the density of said food product and such that the food product is transported through said coils as the helical feed pump rotates;
    feeding the heated food product and gas from the outlet of the first rotating tubular helical feed pump into a second feed member mounted in a holding enclosure where the food product is maintained at the sterilization temperature for a time sufficient to sterilize the food product;
    feeding the food product and gas from the second feed member into a separator which separates the gas and some of the liquid from the food product; and
    feeding the sterile food product from the separator into a container filling machine.

2. A method for continuously and gently sterilizing a food product made up of food chunks immersed in a liquid without damaging the food chunks, comprising the steps of:
    feeding a continuous stream of said food product to be processed into the inlet of a first rotating tubular helical feed pump rotatably mounted in a heating enclosure in which the food product is heated to a sterilization temperature while
    feeding a gas into said first rotating tubular helical feed pump in an amount sufficient to obtain a volumetric ratio of food product to gas within the pump substantially greater than 1:1, said gas forming a bubble having a volume at least sufficient to divide the stream of food product in said pump into slugs such that each coil of the pump contains an upper gas filled space of a density substantially less than the density of said food product and such that the food product is transported through said coils as the helical feed pump rotates;
    feeding the heated food product and gas from the outlet of the first rotating tubular helical feed pump into the inlet of a second rotating helical feed pump rotatably mounted in a holding enclosure where the food product is maintained at the sterilization temperature for a time sufficient to sterilize the food product;
    feeding the food product and gas from the outlet of the second rotating tubular helical feed pump into the inlet of a third rotating tubular helical feed pump rotatably mounted in a cooling enclosure for cooling the food product and gas;
    feeding the cooled food product and gas from the outlet of the third rotating tubular helical feed pump into and through a separator for separating the gas and liquid from the food product; and
    feeding the sterile food product from the outlet of the separator into a container filling machine.

3. A method according to claim 2 wherein the heating, holding and cooling enclosures are all maintained at a pressure above atmospheric.

4. A method for continuously and gently sterilizing a food product made up of food chunks immersed in a liquid through processing apparatus comprising in succession a first tubular helical feed pump rotatably mounted in a heating enclosure, a first separator, a second tubular helical feed pump rotatably mounted in a holding enclosure, a third tubular helical feed pump rotatably mounted in a cooling enclosure, and a second separator, said first feed pump, first separator, second and third feed pumps and second separator all being connected in food product communication with one another, comprising the steps of:

rotatably driving the first, second and third tubular helical feed pumps;

raising and maintaining the temperature of the heating and holding enclosures to a food product temperature for a time sufficient to sterilize the food product;

feeding a continuous stream of said food product to be sterilized into a inlet of the first helical feed pump while feeding a gas into said first rotating tubular helical feed pump in an amount sufficient to obtain a volumetric ratio of food product to gas within the pump substantially greater than 1:1, said gas forming a bubble having a volume at least sufficient to divide the stream of food product in said pump into slugs such that each coil of the pump contains an upper gas filled space of a density substantially less than the density of said food product and such that the food product is transported through said coils as the helical feed pump rotates;

separating the first gas from the food product in the first separator;

introducing a second gas along with the food product into the inlet of the second tubular helical feed pump for transporting said food product through the holding enclosure for a time period sufficient to aseptically process the food product;

feeding the sterile food product and gas from the outlet of the second rotating tubular helical feed pump into the inlet of a third rotating tubular helical feed pump rotatably mounted in a cooling enclosure for cooling the food product and gas;

separating the second gas and liquid from the aseptically processed food product in the second separator to form aseptically processed food chunks; and feeding the sterile food chunks from the outlet of the second separator and a portion of the liquid separated from the second separator into a container filling machine.

5. A method according to claim 4 wherein the first gas is a nonsterile gas and the second gas is a sterile gas.

6. A method according to claim 5 wherein the sterile gas is a filtered, preheated gas free of live bacteria.

7. A method according to claim 6 wherein the heating, holding and cooling enclosures and the first and second separators are all maintained at a pressure above atmospheric.

8. A method for continuously and gently sterilizing a food product made up of food chunks immersed in a liquid without damaging the food chunks, comprising the steps of:

feeding a continuous stream of said food product to be processed into the inlet of a rotating tubular helical feed pump rotatably mounted in a heating enclosure in which the food product is heated to a predetermined temperature in the tubular helical feed pump while feeding a gas into said first rotating tubular helical feed pump in an amount sufficient to obtain a volumetric ratio of food product to gas within the pump substantially greater than 1:1, said gas forming a bubble having a volume at least sufficient to divide the stream of food product in said pump into slugs such that each coil of the pump contains an upper gas filled space of a density substantially less than the density of said food product and such that the food product is transported through said coils as the helical feed pump rotates;

feeding the food product and gas from the feed pump into a separator which separates the gas from the food product; and feeding the food product from the separator into a container; said predetermined temperature selected so that the temperature of the food product remains at least at the sterilization temperature for a time sufficient to sterilize the food product.

9. A method according to claim 8 comprising the further step of cooling the sterile food product after it is fed from the separator.

10. A method for continuously and gently sterilizing a food product made up of food chunks immersed in a liquid through processing apparatus comprising in succession a tubular helical feed pump rotatably mounted in a heating and holding enclosure, and a first separator connected in food product communication with the heating and holding enclosure, comprising the steps of:

rotatably driving the tubular helical feed pump;

raising and maintaining the temperature of the heating and holding enclosure to a food product sterilization temperature;

feeding a continuous stream of said food product to be processed into the inlet of the tubular helical feed pump for transport of the food product through the feed pump into the separator while feeding a gas into said first rotating tubular helical feed pump in an amount sufficient to obtain a volumetric ratio of food product to gas within the pump substantially greater than 1:1, said gas forming a bubble having a volume at least sufficient to divide the stream of food product in said pump into slugs such that each coil of the pump contains an upper gas filled space of a density substantially less than the density of said food product and such that the food prdouct is transported through said coils as the helical feed pump rotates;

separating the gas from the food product in the separator; and feeding the processed food product from the outlet of the separator into a container.

11. The method of any of claims 1, 2, 4, 8 and 10 wherein feeding a gas into said first rotating tubular helical feed pump comprises feeding an amount of gas sufficient to obtain a ratio of food product to gas of about 5:1.

* * * * *